Patented May 21, 1935

2,002,447

UNITED STATES PATENT OFFICE 2,002,447

HALOGEN ALKENYL PHENOLS AND MANUFACTURE THEREOF

Stanislaus Deichsel, Wuppertal-Elberfeld, Germany, assignor to Winthrop Chemical Company, Inc., New York, N. Y., a corporation of New York No Drawing. Application October 30, 1933, Serial No. 695,958. In Germany November 11, 1932

14 Claims. (Cl. 260—154)

This invention relates to alkenyl halogen phenols and to a process of preparing the same.

In accordance with the present invention products of high disinfecting power are obtainable by the synthesis of halogen phenols containing attached to the benzene nucleus an alkenyl or cycloalkenyl group of 4 to 7 carbon atoms containing one double bond. The said new halogen phenol substitution products are distinguished by their superior disinfecting action as compared with similarly constituted known compounds.

In accordance with the present invention halogen phenols substituted in the benzene nucleus by an alkenyl or cycloalkenyl group of 4 to 7 carbon atoms containing one double bond are prepared by reacting upon a halogen phenol with a reactive ester of a $\Delta_2$-unsaturated aliphatic or alicyclic primary alcohol of 4 to 7 carbon atoms in the presence of an alkali metal hydroxide and of an organic solvent which is inert to the reacting components, while heating the reaction mixture. Reactive esters of $\Delta_2$-unsaturated aliphatic or alicyclic primary alcohols of 4 to 7 carbon atoms which are suitable for the process of the present invention are, for instance, the esters of the alcohols specified with hydrohalic and arylsulfonic acids, particularly toluene sulfonic acid. Sodium hydroxide is preferred as the alkaline condensing agent but potassium hydroxide can likewise be used. Organic solvents which are indifferent to the reacting components are, for instance, benzene, toluene, xylene, ligroin and decaline. $\Delta_2$-alkenyl or $\Delta_2$-cycloalkenyl-halogen-phenols are obtainable in the above described manner. The $\Delta_2$-alkenyl or $\Delta_2$-cycloalkenyl compounds may be rearranged to $\Delta_1$-alkenyl or $\Delta_1$-cycloalkenyl compounds in the manner known per se by treatment with an alcoholic caustic alkali solution at elevated temperature.

It has further been found that the halogen alkenyl phenols are obtainable by heating $\Delta_2$-alkenyl halogen phenol ethers at elevated temperature, for instance, to boiling, in accordance with the method of Claisen, by which treatment the etherlike bound alkenyl group is rearranged to a carbon atom of the benzene nucleus.

The halogen phenols substituted by an alkenyl or cycloalkenyl group of 4 to 7 carbon atoms containing one double bond thus obtainable are colorless or weakly colored oils which can be distilled under reduced pressure without decomposition.

The invention is further illustrated by the following examples but it is not restricted thereto:—

Example 1.—A solution of 2 mols. of meta-chlorophenol in 650 grams of benzene is mixed with one mol of pulverized sodium hydroxide while stirring. The mixture is heated under reflux to boiling. One mol of $\Delta_2$-pentenyl-bromide is gradually dropped in. After short boiling the solvent is removed by distillation, the residue is dissolved in dilute caustic alkali lye, the parts which are insoluble in alkali are removed by extraction with petroleum ether and the remaining alkaline solution is acidified and extracted by means of ether. The ether is distilled off from the extract, and the residue is fractionated. About 0.7 mol of meta-chloro-ortho-$\Delta_2$-pentenyl phenol are thus obtained in the form of a thinly liquid oil which boils at 122° to 124° C. at 4 mm. pressure.

The meta-chloro-ortho-$\Delta_2$-pentenyl phenol may be transformed to the meta-chloro-ortho-$\Delta_1$-pentenyl phenol by treatment with concentrated methyl alcoholic caustic potash at 130° C. for about 1 hour and isolating the reaction product in the manner set forth above.

In an analogous manner the corresponding crotyl-, hexenyl-, heptenyl and cyclopentenyl and cyclohexenyl substitution products of meta-chloro-phenol are obtainable.

Instead of the bromides the chlorides, iodides or para-toluene sulfonic acid esters of the alkenyl and cycloalkenyl compounds may be used.

Example 2.—When using in the process described in Example 1 para-fluoro-phenol instead of meta-chloro-phenol, para-fluoro-ortho-$\Delta_2$-pentenyl phenol is obtained in the form of a thinly liquid oil which boils at 124°–126° C. under 11.5 mm. pressure.

Example 3.—A solution of 2 mols of para-bromo-phenol in 650 grams of benzene is mixed with 1 mol of pulverized sodium hydroxide while stirring. The mixture is heated to boiling and 1 mol of normal crotylbromide is gradually dropped in. After working up the mixture in the usual manner the para-bromo-ortho-crotylphenol is obtained as a thinly liquid oil, boiling at 135° to 137° C. under 5 mm. pressure.

We claim:—

1. Phenols which are substituted at the benzene nucleus by a halogen atom and by an unsaturated organic radical of 4 to 7 carbon atoms selected from the group consisting of alkenyl and cycloalkenyl groups containing one double bond, which products display a disinfecting action.

2. Pentenyl phenols which are substituted at the benzene nucleus by a halogen atom, which products display a disinfecting action.

3. Phenols substituted at the benzene nucleus by a chlorine atom and by an unsaturated organic radical of 4 to 7 carbon atoms selected from the group consisting of alkenyl and cycloalkenyl groups containing one double bond, which products display a disinfecting action.

4. Pentenyl phenols which are substituted at the benzene nucleus by a chlorine atom, which products display a disinfecting action.

5. $\Delta_2$-pentenyl phenols which are substituted at the benzene nucleus by a chlorine atom, which products display a disinfecting action.

6. Meta - chloro - ortho - $\Delta_2$ - pentenyl phenol, which product is a colorless oil boiling under 4 mm. pressure at 122° to 124° C. and displays a disinfecting action.

7. The process which comprises reacting upon a phenol which is substituted in the benzene nucleus by a halogen atom with a reactive ester of a $\Delta_2$-unsaturated primary alcohol of 4 to 7 carbon atoms, which alcohol is selected from the group consisting of aliphatic and alicyclic alcohols in the presence of an alkali metal hydroxide and an organic solvent which is indifferent to the reacting components, while heating.

8. The process which comprises reacting upon a phenol which is substituted in the benzene nucleus by a halogen atom with a primary $\Delta_2$-pentenylhalide in the presence of an alkali metal hydroxide and an organic solvent which is indifferent to the reacting components, while heating.

9. The process which comprises reacting upon a mono-chlorophenol with a reactive ester of a $\Delta_2$-unsaturated primary alcohol of 4 to 7 carbon atoms, which alcohol is selected from the group consisting of aliphatic and alicyclic alcohols in the presence of an alkali metal hydroxide and an organic solvent which is indifferent to the reacting components, while heating.

10. The process which comprises reacting upon a mono-chlorophenol with a primary $\Delta_2$-pentenylhalide in the presence of an alkali metal hydroxide and an organic solvent which is indifferent to the reacting components, while heating.

11. The process which comprises reacting upon a phenol which is substituted in the benzene nucleus by a halogen atom with $\Delta_2$-pentenylbromide in the presence of an alkali metal hydroxide and a solvent which is indifferent to the reacting components, while heating.

12. The process which comprises reacting upon a mono-chlorophenol with $\Delta_2$-pentenylbromide in the presence of an alkali metal hydroxide and a solvent which is indifferent to the reacting components, while heating.

13. The process which comprises reacting upon meta-chloro phenol with $\Delta_2$-pentenylbromide in the presence of an alkali metal hydroxide and in the presence of benzene, while heating.

14. The process which comprises reacting upon 2 mols of meta-chloro phenol with about 1 mol of $\Delta_2$-pentenylbromide in the presence of about one mol of sodium hydroxide and of benzene, while heating.

STANISLAUS DEICHSEL.